INVENTOR.
JOHN VIRDEN DAVIS.

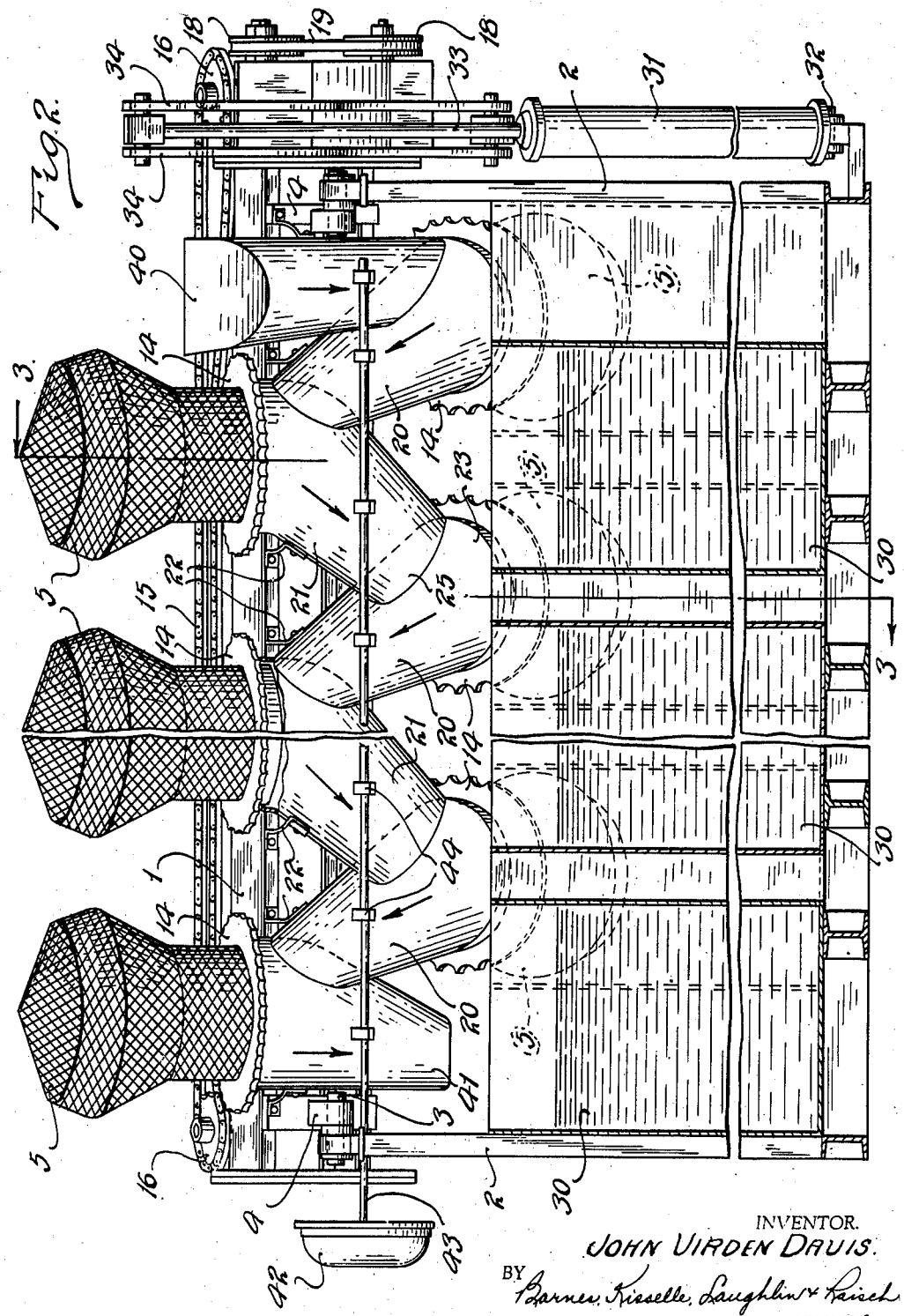

May 18, 1943. J. V. DAVIS 2,319,391
AUTOMATIC BULK TREATING MACHINE
Filed Sept. 14, 1940 6 Sheets-Sheet 3
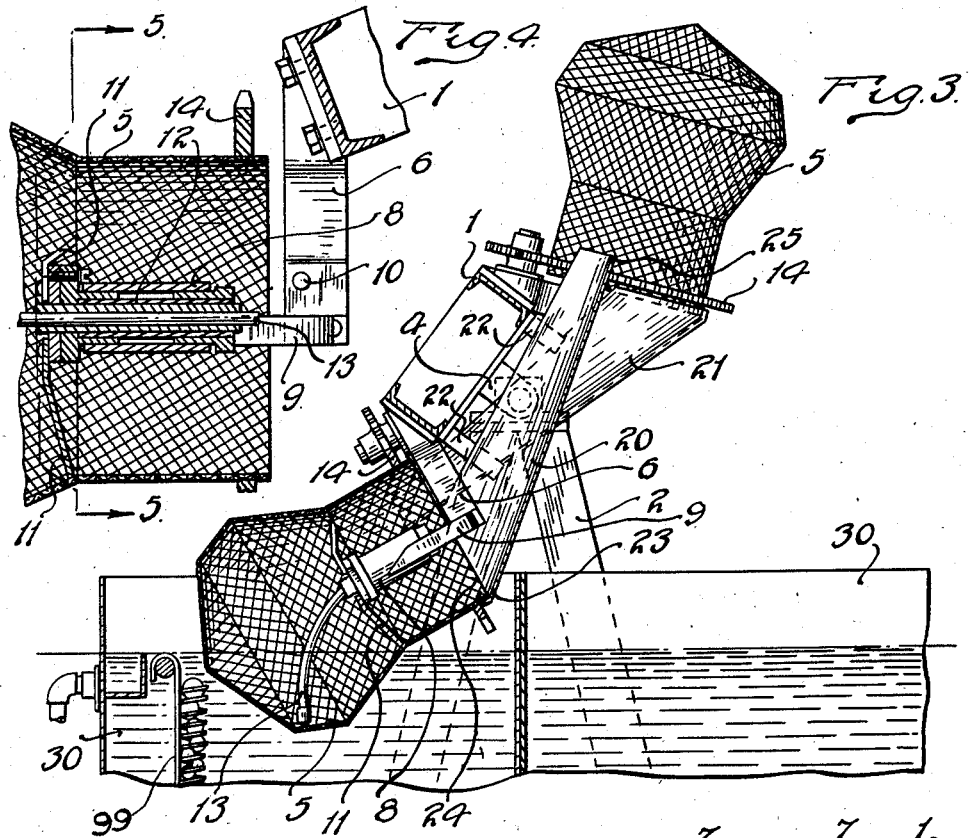
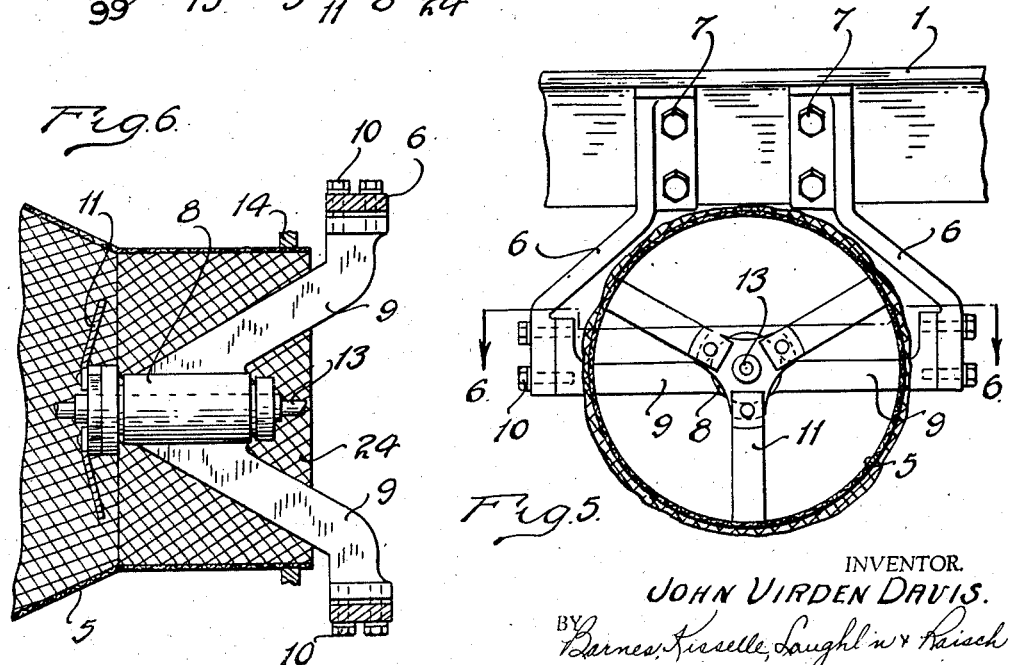
INVENTOR.
JOHN VIRDEN DAVIS.
BY Barnes, Kisselle, Laughlin & Raisch
ATTORNEYS.

May 18, 1943.  J. V. DAVIS  2,319,391
AUTOMATIC BULK TREATING MACHINE
Filed Sept. 14, 1940  6 Sheets-Sheet 4

INVENTOR.
JOHN VIRDEN DAVIS.
BY
ATTORNEYS.

May 18, 1943.  J. V. DAVIS  2,319,391
AUTOMATIC BULK TREATING MACHINE
Filed Sept. 14, 1940  6 Sheets-Sheet 5

INVENTOR.
JOHN VIRDEN DAVIS.
BY
ATTORNEYS.

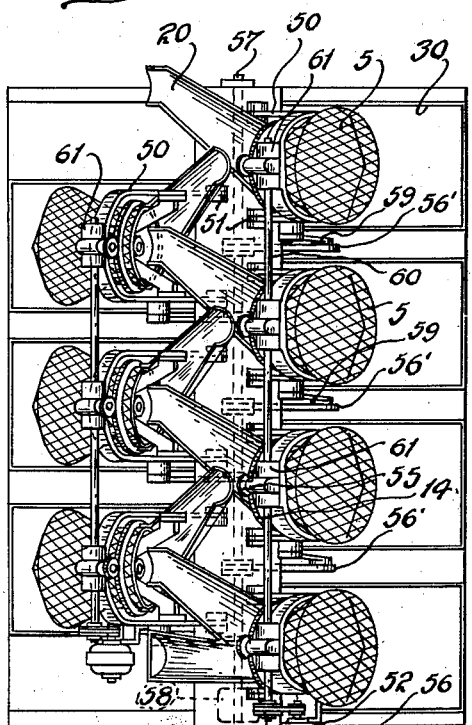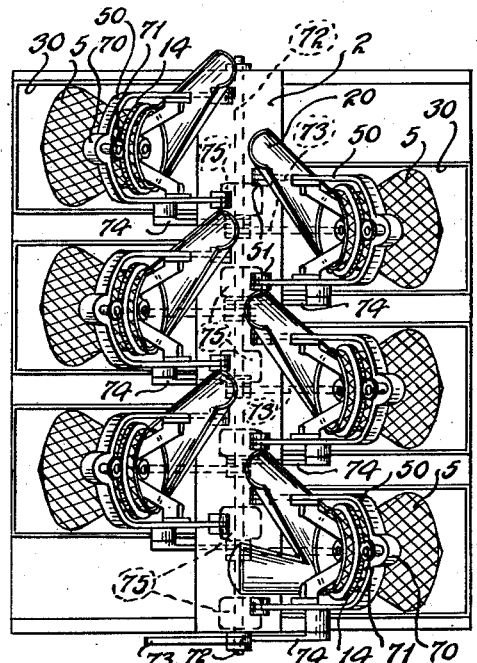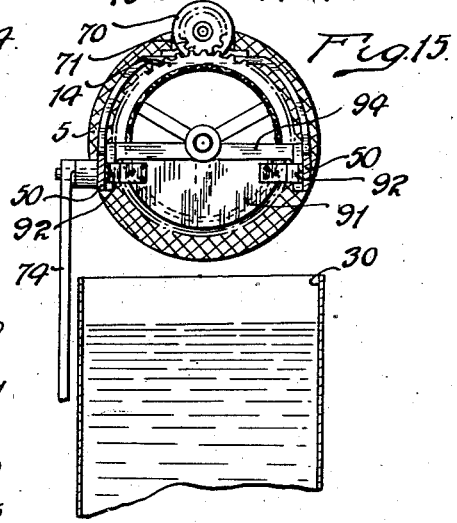

Patented May 18, 1943

2,319,391

UNITED STATES PATENT OFFICE 2,319,391

AUTOMATIC BULK TREATING MACHINE

John Virden Davis, Detroit, Mich., assignor to The Udylite Corporation, Detroit, Mich., a corporation of Delaware Application September 14, 1940, Serial No. 356,776

16 Claims. (Cl. 214—17)

This invention relates to an automatic bulk treating machine.

It is an object of this invention to produce a machine for automatically handling articles, particularly small parts in bulk while subjecting the parts to various treatments such as electrochemical cleaning, water rinsing, liquid chemical dips, electroplating, drying, chemical oxidation, phosphatizing, heat treating, etc.

It is also an object of this invention to produce a machine of this type which efficiently handles the work during the various treatments and which efficiently transfers the work from one treatment to the other.

This invention also contemplates a machine of the above type which is more compact than machines heretofore known for treating small metal parts in bulk.

In the drawings:

Fig. 2 is a sectional view through the tank along the line 2—2 of Fig. 1.

Fig. 3 is a section along the line 3—3 of Fig. 2.

Fig. 4 is an enlarged detail sectional view through one of the perforated barrels showing its support shaft.

Fig. 5 is a section along the line 5—5 of Fig. 4.

Fig. 6 is a section along the line 6—6 of Fig. 5.

Figs. 12, 13 and 14 are plan views of the modified forms of the invention shown in Figs. 8, 9 and 10.

Fig. 15 is a section along the line 15—15 of Fig. 11.

Figure 7:
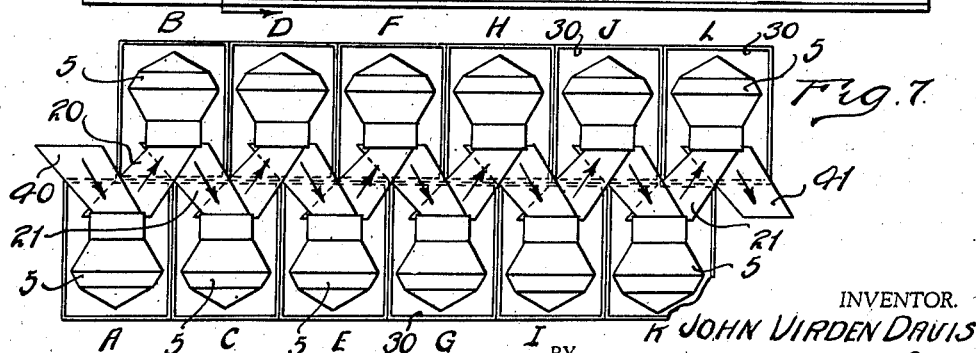
Fig. 7 is a top plan view of the rotating plating barrels, work transfer chutes and plating tanks.

Referring more particularly to the drawings it will be seen that the machine comprises a rectangular frame 1 made from channel irons which is pivotally supported at each end on the upright support members 2 by means of the stub shafts 3 and bracket bearing members 4. A plurality of perforated work containers or barrels 5 are rotatably supported upon the frame 1. The barrels 5 on the one side of the frame 1 are offset from the barrels 5 on the other side of the frame as will be seen in Figs. 2 and 7.

The support for each barrel 5 comprises a pair of brackets 6 which are secured to the frame 1 by bolts 7. A bearing member 8 (Fig. 6) is carried by a V bracket 9 which is secured to the brackets 6 by the bolts 10. Each barrel 5 is fixed to a spider 11 which is fixed to a hollow shaft 12 journalled within the bearing 8. The insulated electric conductor to the work 13 extends through the hollow shaft 12. When the work is to be electroplated, then conductor 13 will be a cathode and the metal to be plated will be supplied to the plating solution in tank 30 by any suitable anode 99 such as a soluble ball anode of the type described in the Dubpernell Patent 1,868,052.

A gear 14 is mounted on the barrel 5 adjacent the open end in a plane perpendicular to the bearing 8. A chain 15 running on sprockets 16 mounted at the opposite ends of the frame 1, meshes with the gears 14 to rotate the barrels 5. Idler sprockets or shoes mounted on the frame between each cylinder to guide the chain over the cylinder sprockets are not shown. Sprockets 16 are driven by a motor 17 through a drive belt 19 and gear reduction mechanism 18 mounted on one end of the frame 1.

The barrels 5 on the one side of the frame 1 are each provided with a chute 20 of solid or perforated material or of wire mesh and the barrels on the other side of the machine are each provided with a chute 21. Chutes 20 and 21 are identical in construction except for being rights and lefts, and each is fixed to the frame 1 by the straps 22. As shown in the drawings each chute has an enlarged end 23 which fits snugly around the open end 24 of the barrel 5. Each chute is tapered from the large end toward its smaller end 25 which projects slightly into the diagonally opposite or offset barrel. The discharge end 25 of each chute intersects the enlarged inlet end 23 of the chute leading from the diagonally opposite barrel. Thus each work barrel 5 has a work discharge chute running out from the open end 24 of the barrel adjacent the bottom thereof and a work feed chute leading into the same barrel with the discharge end of this work feed chute positioned above the enlarged end of the discharge chute.

Each barrel 5, or a number of adjacent barrels 5 performing the same function, is provided with a separate tank 30 for the liquid or gaseous substance with which the work in bulk is to be treated. The pivoted frame 1 is arranged to be tilted or pivoted back and forth like a teeter-totter by any suitable power means. As a matter of description and not of limitation, this means is shown as comprising a pair of cylinders 31 pivotally supported at their lower ends as at 32 and connected by means of piston rods 33 with the ends of a pair of bars 34 fixed to the end of the frame 1. Each cylinder is provided with a piston 35 and air lines 36 above and below the pistons 35.

Figure 1:
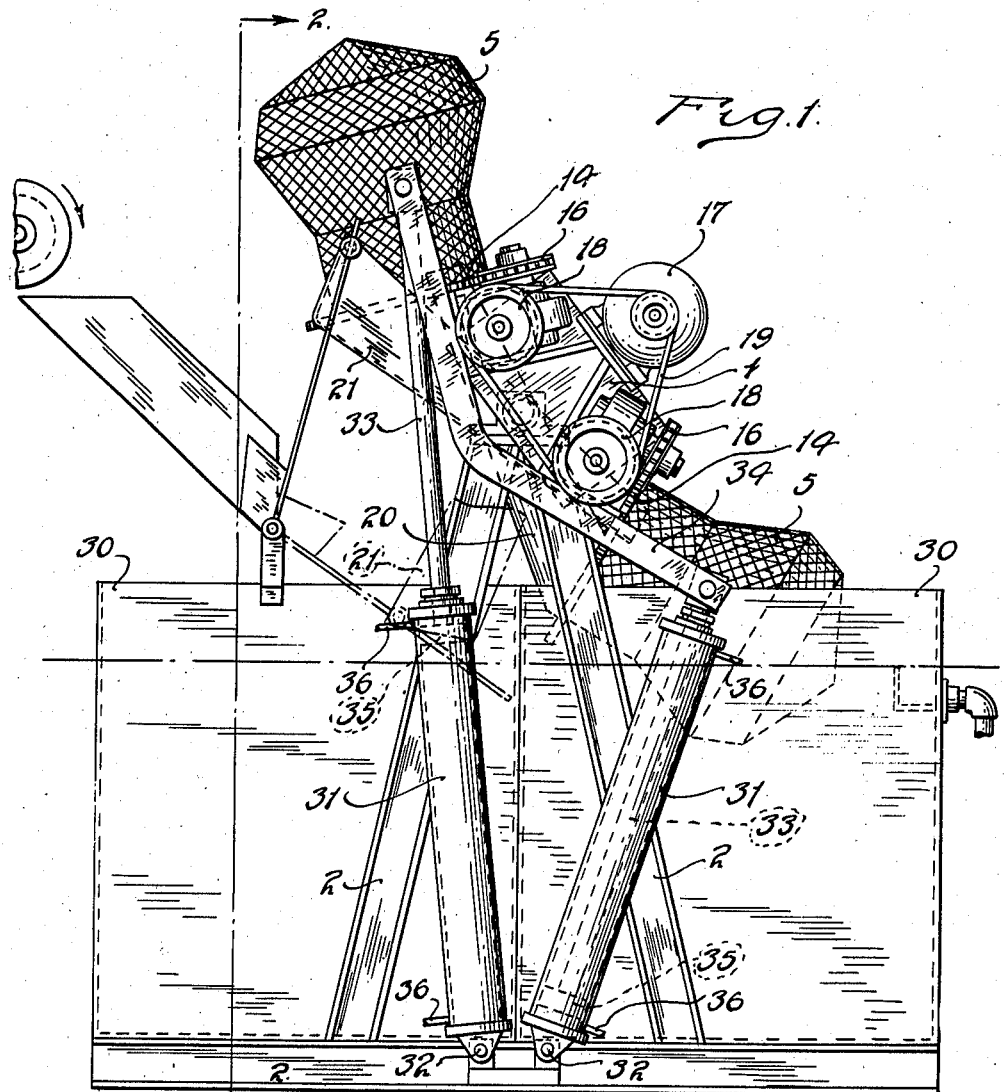
Fig. 1 is an end elevation of the machine.

To tilt the frame counterclockwise from the position shown in Fig. 1, air is admitted below piston 35 in the right hand cylinder and above piston 35 in the left hand cylinder while the air is slowly exhausted from above the piston in the right hand cylinder and from below the piston in the left hand cylinder. To swing the work barrels clockwise the admission and exhausting of the air from the cylinders is reversed from that above described. Valve or other means may be provided to stop or slow down the motion, for example, to permit longer drainage time for the work while the cylinders are being rotated.

Contacts 13 are provided in those work barrels 5 in which the work is to be electroplated, electrocleaned or otherwise treated with electric current, and the corresponding tank 30 for each electroplating barrel 5 is provided with a plating bath and anodes.

In operation the small parts in bulk or other work to be treated is fed into the right hand barrel 5, Fig. 2, through feed chute 40. Feed chute 40 is shown on the left hand side of the machine, Fig. 7. The motor 17 is turned on and operates through the chain 15 and gears 14 to rotate simultaneously all the barrels 5.

By way of illustration it will be assumed that the work is to be zinc plated. In such case tank A will contain an electrochemical cleaning solution, tank B cold water, tank C an acid dip solution, tank D cold water, tanks E, F, G, H and I a zinc plating solution, tank J cold water, tank K hot water, and tank L a hot air blast. As the work is rotated in barrel 5 while immersed in the solution of tank A, it is cleaned. At the end of a predetermined time period or interval air is admitted and exhausted into cylinders 31 either by a manually controlled valve or by means of a well-known solenoid operated air valve controlled by a well-known time clock. At the end of this interval the frame 1 and all the barrels 5 tilt counterclockwise from the position shown in Fig. 1 while the barrels continue rotating. The work is now transferred by gravity from barrel 5 as it is raised out of tank A through chute 20 into the diagonally opposite barrel 5 as it is slowly lowered into tank B where the work is subjected to a cold rinse. Again at the end of the same or a different predetermined time interval the frame 1 and all the rotating barrels are now tilted clockwise again to the position shown in Fig. 1 whereupon the work is transferred from barrel 5 as it rises out of tank B, through chute 21 into barrel 5 as it is lowered into tank C. At this time a new load of work or small parts in bulk can be fed into barrel 5 while lowered in tank A.

The work now in barrel C is shifted alternately by means of the transfer chutes from one diagonally opposite rotating barrel to the other and treated in the liquids in the various tanks, as above described, until it is finally discharged from chute 41. Each time the first barrel 5 is lowered into tank A a new batch of work is fed into feed chute 40. Thus, if desired, at any one time all the rotating barrels 5 in the tanks A, C, E, G, I and K have separate loads of work or small parts in bulk being zinc plated. Thus the plating of the work, the rotation of the barrels and the shifting of the work from one barrel and tank to another and final discharge of the work is continuous and automatic.

To facilitate shifting of the work from one barrel to another, particularly small flat parts which are inclined when wet to stick to the chutes 20 and 21, there is provided a well-known electromagnetic vibrator 42 mounted on the end of a rod 43 which is fixed to each of the chutes 20 and 21 as at 44. The vibrator 42 can be purchased on the open market and is sold under the trade-name "Syntron" by the Syntron Company, Homer City, Pennsylvania. Thus the vibrator 42 acts through shaft 43 to vibrate the chutes 20 and 21 either as the work is being transferred from one barrel to another or the vibrator may be run continuously.

Figure 8:
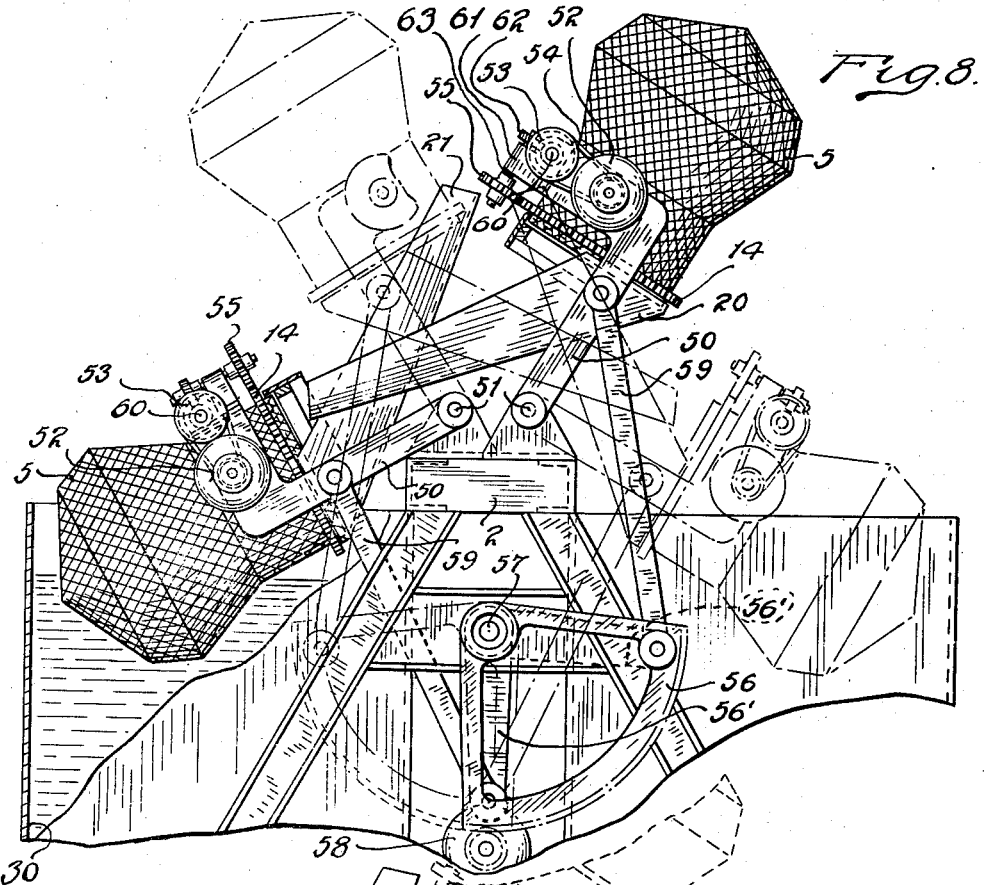
Figs. 8, 9, 10 and 11 are end elevations of modified forms of the invention.

In the modified form shown in Fig. 8 the barrels 5 are positioned in two rows, one on each side of the frame 2 the same as in the principal form of the invention except that each barrel 5 is independently carried on a separate frame 50 pivotally mounted as at 51 on the fixed frame 2. In Fig. 8 the right hand row of barrels 5 are arranged to be swung upwardly simultaneously as the left hand row of barrels 5 is swung downwardly. This is accomplished by a gear segment 56 and arms 56' fixed on shaft 57 which is journaled in the frame 2. The gear segment 56 fixed on the end of shaft 57 is driven by a motor 58. Each arm 56' and the segment 56 is connected to the frame 50 of the respective barrel which it is to tilt by a link 59. Since the motor 58 drives the gear segment, this segment through shaft 57 oscillates the arms 56' to simultaneously tilt both rows of barrels 5.

The barrels 5 are rotated by a drive comprising an electric motor 52 which, through belt 54, drives pulley 53 fixed on the end of shaft 60. The shaft 60 is journaled in brackets 61 carried on frame 50. Shaft 60 is provided with a plurality of worms which mesh with worm gears 62 fixed on the end of the shaft 63 which carries gears 55. Gears 55 mesh with gears 14 to rotate the barrels simultaneously. Fig. 12 is a plan view of the modified form of the invention shown in Fig. 8.

Figure 9:
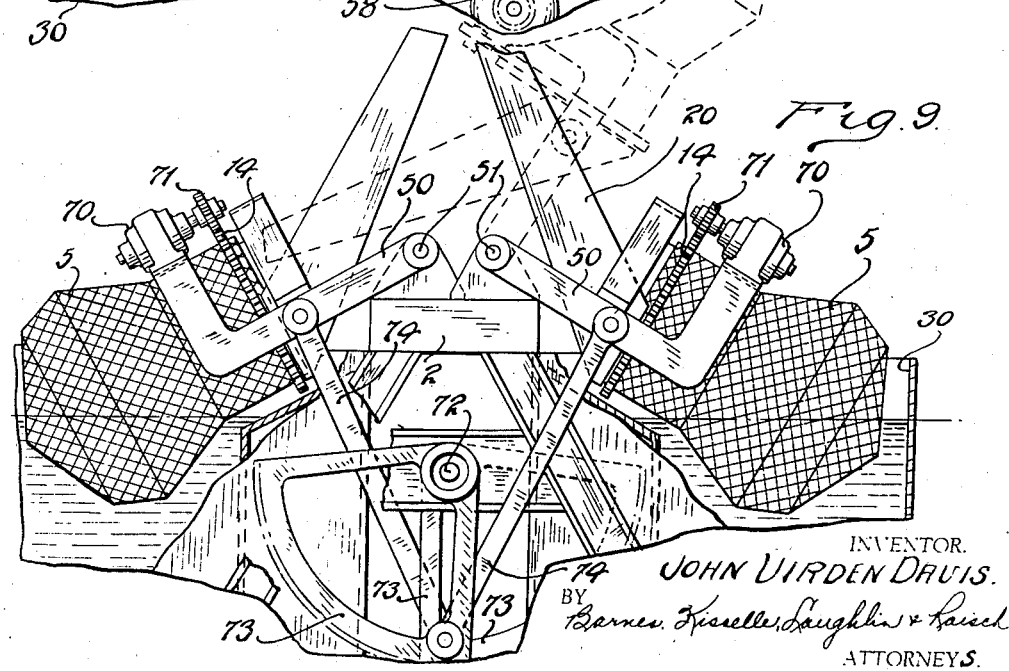

In the form shown in Figs. 9 and 13 the barrels 5 are mounted on the frame 2 in identically the same manner as in the form shown in Fig. 8. However, in this form of the invention each barrel 5 is independently rotated by means of an electric motor 70, gear 71 mounted on the motor shaft which meshes with gear 14. Since the motor drive for each barrel 5 is independent of the drive for the other barrels, in case it is desired not to treat the work while in any barrel 5, the motor for turning such barrel will be turned off so that such barrel will not rotate. When not rotating, such barrel 5 cooperates with the transfer chutes merely to serve as a means for transferring the work from a barrel in one row to the adjacent barrel in the same row. As a matter of fact, it may be desirable to do all the treating on one side of the machine. In such case there would be no need for a row of rotating barrels on the opposite side of the machine. Thus, the machine would be constructed with a row of rotating barrels on one side of the machine and a row of stationary, either perforate or imperforate, boxes on the other side. The stationary or non-rotatable boxes would merely serve as a transfer means to transfer the work from one barrel through the chutes into the next rotating barrel in the same row.

The barrels 5 are also mounted so that they can be tilted separately. To this end a fixed shaft 72 is mounted on the frame 2. A gear segment 73, one for each barrel, is rotatably mounted on the shaft 72. Each gear segment 73 is connected to the frame 50 by a link 74. Each gear segment 73 is driven by a separate motor 75 on the frame 2.

Figure 10:
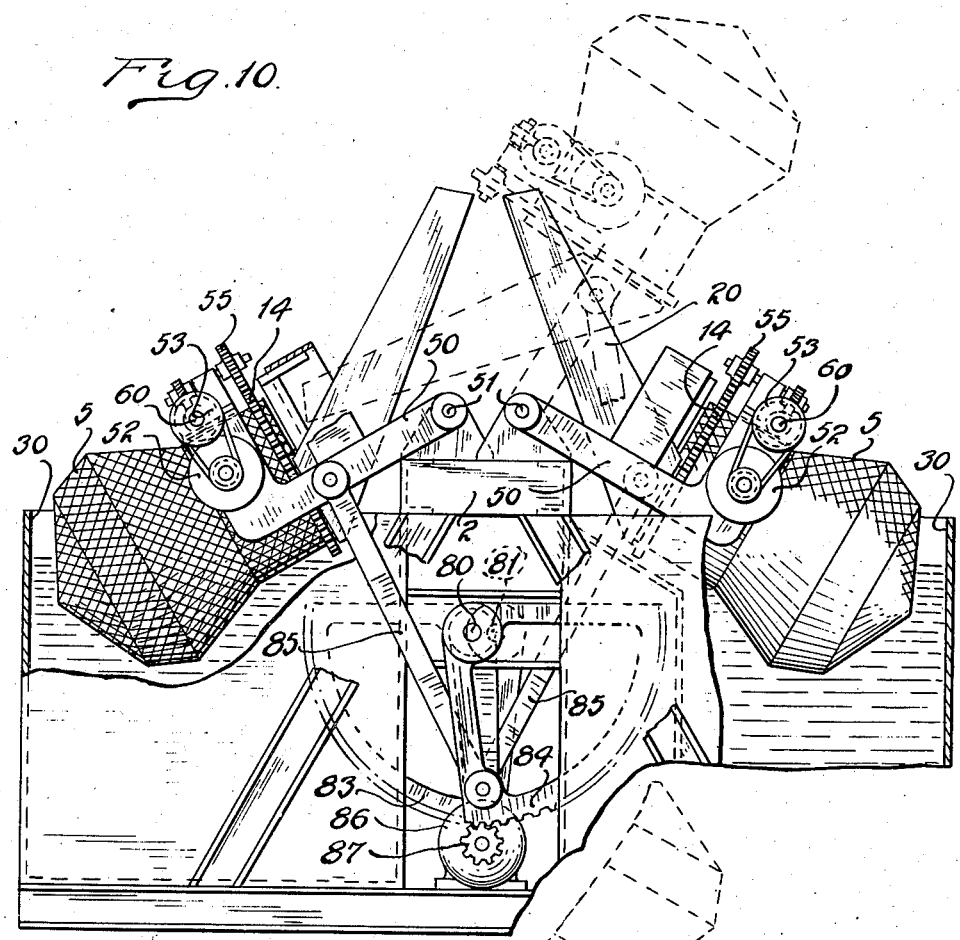

In the form shown in Fig. 10 the barrels 5 are pivotally mounted upon the frame 2 in the same manner as the form of the invention shown in Fig. 8. The barrels in each row are provided with a single drive exactly the same as that of the form shown in Figs. 8 and 12. In this form of the invention, however, the right and left hand rows of barrels are arranged so that they can be raised and lowered independently of each other. To this end a pair of shafts 80 and 81 are journaled in the frame 2. Gear segments 84, one for each barrel in the left hand row, are fixed upon shaft 80 and gear segments 83, one for each of the barrels in the right hand row, are fixed upon shaft 81. The segments 83 and 84 are connected with the pivoted frames 50 of their respective barrels by links 85. The segments 84 and shaft 80 are driven independently from segments 83 and shaft 81. Segments 83 and 84 which are fixed in the ends of shafts 81 and 80 are provided with gear teeth which mesh with gears 87 mounted on the shafts of driving motors 86. Thus, due to the independent drive, either the right or left hand row of barrels can be tilted independently of the other row.

Figure 11:
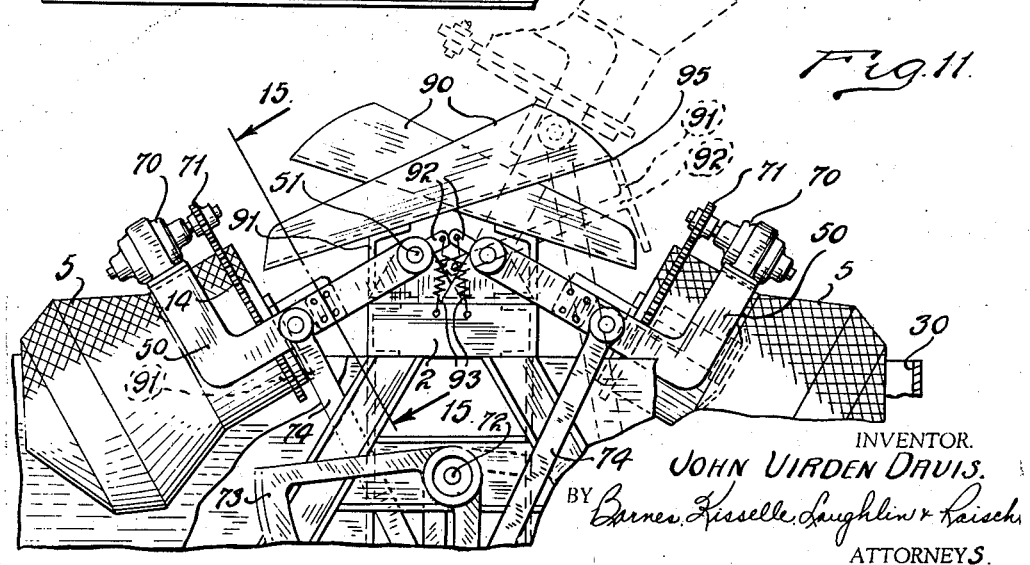

In the form shown in Fig. 11 the barrels are tiltably mounted and rotated in exactly the same manner as the form shown in Fig. 9. In this form of the invention, however, the chute 90 for each barrel is fixed as at 91 upon the frame 2. Since the chutes 90 are stationary, a closure 91 is provided for keeping the work in the barrel 5 until it reaches its respective chute 90. The closure 91 is mounted upon arms 92 pivotally supported upon shaft 51. Each closure 91 is continuously urged upward by a tension spring 93. Each barrel is provided with a stop 94 against which the closure 91 abuts when the barrel 5 is lowered. As the barrel 5 is swung upwardly the tension spring 93 holds the closure against stop 94 until the closure strikes the end of the chute 90 as at 95 whereupon further upward movement of the closure 91 is arrested. As the barrel 5 continues swinging upwardly, closure 91 is withdrawn from the mouth of the barrel and the work is discharged into the chute 90. As the barrel swings downwardly from raised position, stop 94 abuts the upper edge of the closure 91 thereby carrying the closure down with the barrel to lowered position against the tension of spring 93.

Another advantage of the above described construction and the modifications thereof is that it allows a wide choice of material in that each separate chute and each separate cylinder can be made from a material that is suitable for the solution or medium touching it.

I claim:

1. A machine adapted for treating articles in bulk comprising a frame, a plurality of opposed rows of work containers tiltably mounted on the said frame, a support for each work container tiltably mounted on said frame, mechanism for rotatably mounting some of the work containers on their respective supports, and gravity actuated means for transferring the articles by gravity from one work container in one row when said work container is raised to a work container in another row when said other work container is lowered.

2. A machine adapted for treating articles in bulk comprising a frame, a plurality of opposed rows of work containers tiltably mounted on the said frame, a support for each work container tiltably mounted on said frame, mechanism for rotatably mounting some of the work containers on their respective supports, and chute mechanism extending from one work container in one row to a second work container in another row and from said second container to a third container in the first-mentioned row whereby when the first container is raised the work is transferred by gravity from the first to the second container and when the second container is raised the work is transferred to the said third container.

3. A machine for treating articles in bulk comprising a stationary frame, work containers positioned on opposite sides of the frame, a tiltable support for each of the work containers, mechanism for rotatably mounting one of said work containers on its support, a chute extending from said rotatable work container to the work container opposite thereof whereby when the rotatable work container is raised the work is transferred by gravity along said chute into the lowered work container on the opposite side of the frame.

4. A machine for treating articles in bulk comprising a stationary frame, work containers positioned on opposite sides of the frame, a tiltable support for each of the work containers, mechanism for rotatably mounting one of said work containers on its support, a chute mounted on the tiltable support for the rotatable work container and extending toward the opposite work container whereby when the rotatable work container is raised the work is transferred by gravity along said chute into the lowered work container on the opposite side of the frame.

5. A machine adapted for treating articles in bulk comprising a plurality of tanks adapted to receive media for treating the said articles, a stationary frame, a plurality of barrels for the articles to be treated positioned in rows on opposite sides of the said frame, tiltable support means for each of the rows of barrels whereby each row of barrels is swung upwardly and downwardly as a unit into and out of said tanks, mechanism for rotatably mounting some of the barrels on the said tiltable support, a discharge chute and an intake chute running between each barrel in one row to adjacent barrels in an opposite row whereby when the rows of barrels are raised and lowered the work is transferred simultaneously from one row to the other and lengthwise of the rows from barrel to barrel.

6. A machine adapted for treating articles in bulk comprising a stationary frame, at least two barrels for the articles to be treated positioned on one side of the frame and a barrel positioned on the opposite side of the frame, tiltable supports for each of said barrels pivotally mounted on said frame, a chute extending from the bottom of the open end of one barrel diagonally into and adjacent the top of the open end of the barrel on the other side of the frame, and a chute extending from the bottom of the open end of the latter barrel diagonally adjacent the top of the open end of a third barrel on the opposite side of the frame and adjacent the first-mentioned barrel whereby when the frame is tilted the articles are transferred by gravity through the chutes from the barrel being raised to the barrel being lowered.

7. A machine adapted for treating articles in bulk comprising a plurality of tanks adapted to receive media for treating the said articles, a stationary frame, a plurality of tiltable supports pivotally mounted on the said frame, a plurality of shafts mounted on some of the said tiltable supports in planes approximately perpendicular to the axis about which the support tilts, a plurality of article containers rotatably supported on the shafts and a plurality of article containers supported on the other tiltable supports, and means for transferring the articles by gravity from one article container on one side of the frame when said article container is raised to an article container on the opposite side of the frame while said latter article container is in lowered position.

8. A machine adapted for treating articles in bulk comprising a plurality of tanks adapted to receive media for treating the said articles, a tiltable frame, a plurality of rotatable barrels supported on opposite sides of the frame, and means for transferring the articles by gravity from one barrel on one side of the frame to a barrel on the opposite side of the frame as the frame tilts thereby raising the first mentioned barrel from which the articles are discharged and lowering the other barrel into which the articles are fed.

9. A machine adapted for treating articles in bulk comprising a tiltable frame, a plurality of tanks adapted to receive media for treating the said articles positioned along opposite sides of the frame, a plurality of perforated barrels rotatably supported on the frame, each barrel being offset from the barrel on the opposite side of the frame, and means for transferring the articles by gravity from one barrel on one side of the frame to a barrel on the opposite side of the frame as the frame tilts thereby raising the first mentioned barrel from which the articles are discharged and thereby lowering the other barrel into which the articles are fed.

10. A machine adapted for treating articles in bulk comprising a tiltable frame, a plurality of tanks adapted to receive media for treating the said articles positioned along opposite sides of the frame, a plurality of perforated barrels rotatably supported on the frame, each barrel being offset from the barrel on the opposite side of the frame, a chute extending from the open end of each barrel to the open end of the offset barrel on the opposite side of the frame whereby when the frame is tilted the articles are transferred by gravity through the chutes from the barrel being raised to the barrel being lowered.

11. A machine adapted for treating articles in bulk comprising a tiltable frame, a plurality of tanks adapted to receive media for treating the said articles positioned along opposite sides of the frame, a plurality of perforated barrels rotatably supported on the frame, each barrel being offset from the barrel on the opposite side of the frame, a chute extending from the bottom of the open end of the one barrel diagonally into and adjacent the top of the open end of the offset barrel whereby when the frame is tilted the articles are transferred by gravity through the chutes from the barrel being raised to the barrel being lowered.

12. A machine adapted for treating articles in bulk comprising a tiltable frame, a plurality of tanks adapted to receive media for treating the said articles positioned along opposite sides of the frame, a plurality of perforated barrels rotatably supported on the frame, each barrel being offset from the barrel on the opposite side of the frame, each barrel having a pair of chutes, a work discharge chute extending from the open end of the said barrel into the open end of the offset barrel positioned on the work discharge side of the said barrel, and a feed chute extending from an opposite offset barrel on the work feed side of the barrel into the open end of the said barrel above the aforementioned discharge chute.

13. A machine adapted for treating articles in bulk comprising a plurality of tanks adapted to receive media for treating said articles, a tiltable frame, a plurality of rotatable barrels mounted on the one side of the frame and a second plurality of rotatable barrels mounted on the opposite side of the frame in alternate relation with the aforesaid barrels, and article transfer means extending diagonally between each of the alternate opposite barrels whereby as the frame tilts back and forth the work is transferred from one rotating barrel to the other until it has traveled alternately completely through the opposed rows of barrels.

14. A machine adapted for treating articles in bulk comprising a plurality of tanks adapted to receive media for treating the said articles, a tiltable frame, a plurality of shafts supported on opposite sides of the frame in offset planes approximately perpendicular to the axis about which the frame tilts, a plurality of barrels rotatably supported on the said shafts, and means for transferring the articles by gravity from one barrel on one side of the frame to a barrel on the opposite side of the frame as the frame tilts thereby raising the first mentioned barrel from which the articles are discharged and lowering the other barrel into which the articles are fed.

15. A machine adapted for treating articles in bulk comprising a plurality of tanks adapted to receive media for treating the said articles, a tiltable frame, a plurality of shafts supported on opposite sides of the frame in offset planes approximately perpendicular to the axis about which the frame tilts, a plurality of perforated barrels rotatably supported on the said shafts, a chute extending from the open end of each perforated barrel to the open end of the offset barrel on the opposite side of the frame whereby when the frame is tilted the articles are transferred by gravity through the chutes from the barrel being raised to the barrel being lowered.

16. A machine adapted for treating articles in bulk comprising a tiltable frame, a plurality of tanks adapted to receive media for treating the said articles positioned along opposite sides of the frame, a plurality of perforated barrels rotatably supported on the frame, each barrel being offset from the barrel on the opposite side of the frame, a chute extending from the open end of each barrel to the open end of the offset barrel on the opposite side of the frame whereby when the frame is tilted the articles are transferred by gravity through the chutes from the barrel being raised to the barrel being lowered, and vibrating mechanism for vibrating the chutes to facilitate transfer of the articles down the chute.

JOHN VIRDEN DAVIS.